(12) United States Patent
Clark

(10) Patent No.: US 6,526,692 B2
(45) Date of Patent: Mar. 4, 2003

(54) METHOD AND APPARATUS FOR IN-GROUND SUBTERRANEAN TERMITE DETECTION

(75) Inventor: Terrence Jon Clark, Lodi, CA (US)

(73) Assignee: Clark Pest Control of Stockton, Inc., Lodi, CA (US)

( * ) Notice: Subject to any disclaimer, the term of this patent is extended or adjusted under 35 U.S.C. 154(b) by 0 days.

(21) Appl. No.: 09/882,797

(22) Filed: Jun. 15, 2001

(65) Prior Publication Data

US 2002/0189153 A1 Dec. 19, 2002

(51) Int. Cl.[7] .................................................. A01M 1/20
(52) U.S. Cl. ......................................................... 43/107
(58) Field of Search ............................... 43/107, 132.1, 43/124; 52/101

(56) References Cited

U.S. PATENT DOCUMENTS

| | | | |
|---|---|---|---|
| 4,941,356 A | 7/1990 | Pallaske | 73/587 |
| 5,555,672 A | 9/1996 | Thorne et al. | 43/124 |
| 5,571,967 A | 11/1996 | Tanaka et al. | 73/587 |
| 5,575,105 A | 11/1996 | Otomo | 43/132.1 |
| 5,592,774 A * | 1/1997 | Galyon | 43/124 |
| 5,753,183 A | 5/1998 | Ohr et al. | 422/37 |
| 5,815,090 A | 9/1998 | Su | 340/870.16 |
| D399,765 S | 10/1998 | Hovious | D10/46 |
| 5,832,658 A | 11/1998 | Random | 43/131 |
| 5,877,422 A * | 3/1999 | Otomo | 340/573.2 |
| 5,899,018 A | 5/1999 | Gordon et al. | 43/131 |
| 5,901,496 A * | 5/1999 | Woodruff | 43/124 |
| 5,937,571 A | 8/1999 | Megargle et al. | 43/131 |
| 5,973,008 A | 10/1999 | DeAngelis et al. | 514/594 |
| 6,003,266 A * | 12/1999 | Woodruff | 43/124 |
| 6,016,625 A | 1/2000 | Bishoff et al. | 43/121 |
| 6,052,066 A | 4/2000 | Su | 340/870.16 |
| 6,058,646 A | 5/2000 | Bishoff et al. | 43/131 |
| 6,065,241 A * | 5/2000 | Woodruff | 239/59 |
| 6,079,151 A | 6/2000 | Bishoff et al. | 43/132.1 |
| 6,100,805 A | 8/2000 | Lake | 340/573.1 |
| 6,150,944 A | 11/2000 | Martin et al. | 340/632 |
| 6,166,641 A | 12/2000 | Oguchi et al. | 340/573.1 |
| 6,189,393 B1 * | 2/2001 | Cates | 73/865.8 |
| 6,195,934 B1 | 3/2001 | Megargle et al. | 43/131 |
| 6,219,960 B1 * | 4/2001 | Contadini et al. | 43/107 |
| 6,370,811 B1 * | 4/2002 | Masterson | 340/573.1 |
| 6,370,812 B1 * | 4/2002 | Burns et al. | 43/124 |
| 6,373,391 B1 * | 4/2002 | Lake et al. | 340/573.1 |
| 6,374,536 B1 * | 4/2002 | Washburn | 43/131 |

* cited by examiner

Primary Examiner—Thomas Price
(74) Attorney, Agent, or Firm—Peter R. Leal, Esq.; Gray Cary Ware & Freidenrich, LLP

(57) ABSTRACT

Apparatus and method for detecting the presence of wood destroying subterranean termites. The apparatus includes a housing having a hollow chamber with a closed upper portion (top) and an open lower portion (bottom) that is secured to a monitor stick to be inserted in the ground. The hollow chamber top has a peripheral flange that overhangs or extends beyond the perimeter of the chamber. A monitor stick is inserted into and secured in the chamber interior and in the ground. The top is provided with an aperture having a penetrable seal such that a combustible gas detector can be inserted into the chamber to measure the combustible gas in the chamber. When wood destroying termites are present and attacking the monitor stick, they generate combustible gas that becomes trapped in the closed hollow chamber and can be detected by the combustible gas detector. A second material also can be used, e.g., cardboard wrapped around the monitor stick to attract the pests. A plurality of monitors can be used to provide detection for a given structure and allow for detection prior to the structure becoming infested and structurally damaged.

18 Claims, 4 Drawing Sheets

METHOD AND APPARATUS FOR IN-GROUND SUBTERRANEAN TERMITE DETECTION

FIELD OF THE INVENTION

The present invention relates generally to a method and device for subterranean termite detection and more particularly to in-ground devices for subterranean termite detection.

BACKGROUND OF THE INVENTION

Various devices and techniques have been developed to help control subterranean termite populations to protect structures. Traditional methods for controlling pests such as termites include preventative measures such as pre-treatment of new construction sites with pesticidal agents to prevent subsequent infestation by subterranean termites.

Other traditional methods involve post-infestation efforts, that is, controlling pests once they have been detected after construction. After detection, the pests are typically controlled by inducing the pests to ingest or otherwise come into contact, voluntarily or involuntarily, with, a toxicant. For example, one method utilizes pressure injection of pesticides to directly treat termite galleries. Another approach involves pressure injecting the soil surrounding the structure to provide a barrier of pesticide. Other more recent methods of termite control involve baiting the termite colony with a cellulose matrix containing a termite toxicant.

These traditional methods fail to provide any means for quickly detecting termite infestation.

Methods are known for detecting subterranean termites in a structure. Other methods are known whereby pests are detected by a pest alarm unit. Still other methods provide a termite detector which detect termites by occlusion of a cavity by termites.

However there continues to exist a need for a device and method that is effective for subterranean termite detection that is both inexpensive and simple to use. There also is a continuing need for a device and method for detecting subterranean termites that is relatively inexpensive to manufacture and simple for the average operator to operate.

OBJECTS AND SUMMARY OF THE INVENTION

It is an object of the present invention to provide a simple, non-strenuous method for the detection of subterranean termites available to all pest control operators.

It is a further object to provide an inexpensive in-ground device for the detection of wood-destroying pests, such as subterranean termites, without having to remove the device from the ground, that is available to all pest control operators.

The present invention provides an in-ground device and method for monitoring pests, particularly wood-destroying pests, and more particularly subterranean termites. Broadly, the present invention contemplates an open ended chamber, a combustible gas detector, and a monitoring stick, and optionally an additional cellulose structure, such as cardboard which at least partially surrounds a portion of the monitoring stick. The wood destroying pests attacking the monitoring stick and/or the additional cellulose will generate a combustible gas that is trapped by the open ended chamber and detected by the combustible gas detector. This indicates the presence of the wood destroying pests.

In a preferred embodiment, the chamber is of a generally tubular shape, open on its lower portion and closed at its upper portion, and has a flange extending from the closed upper portion. The flange is preferably extends outwardly from the chamber upper portion so as to form a peripheral flange that overhangs the chamber. The tubular portion of the chamber need not be uniform in cross-section along its length, and non-circular cross sections may be used, e.g., ellipsoid, triangular, rectangle, hexagonal, octagonal, etc. Preferably, the tubular shape and peripheral flange are circular.

In performing a monitoring function, the device according to the present invention is provided with any suitable pest monitor in the chamber. Preferably, the monitor is a wooden stake of a type that is susceptible to destruction by the pest (or pests) being monitored.

In order to detect whether pests are present, the closed chamber portion of the wood destroying pest monitor is provided with an opening, preferably circular, but which also may be ellipsoid, triangular, hexagonal, octagonal, etc. The opening is designed to receive a plug that seals the opening. The plug itself has a triangular shaped opening that has a sealed condition and penetrable condition that allows for inserting a combustible gas detector into said chamber. The combustible gas detector can be a conventional combustible gas leak detector or similar means- for gas detection.

BRIEF DESCRIPTION OF THE DRAWINGS

Additional features, aspects and advantages of the present invention will become apparent to a person of ordinary skill in the art in view of the following detailed description, made with reference to the accompanying drawings, in which like reference numbers refer to like elements, and in which.

DETAILED DESCRIPTION OF THE DRAWINGS

Figure 1:
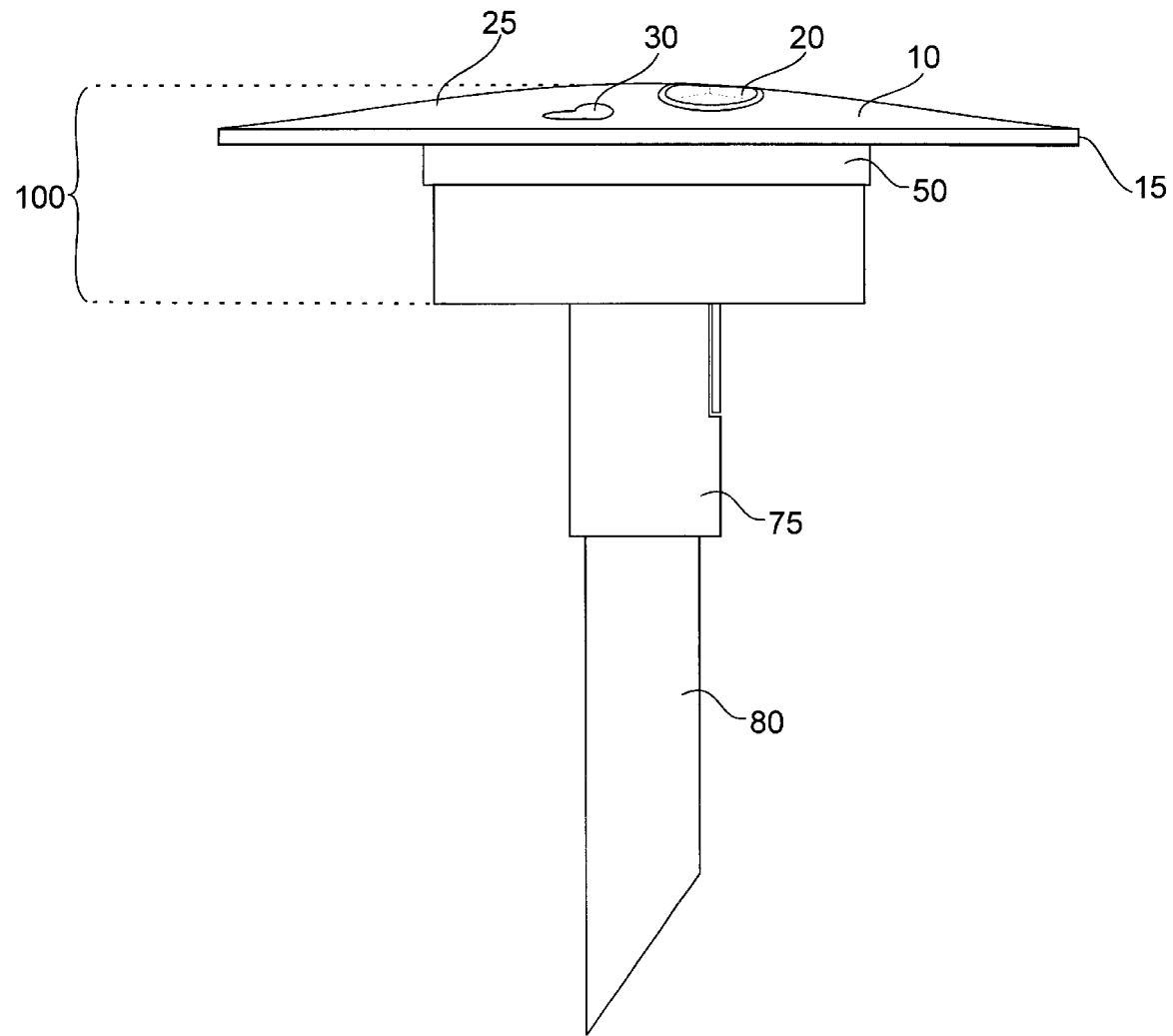
FIG. 1 is a side view of a preferred embodiment of a wood destroying pest monitor in accordance with a preferred embodiment of the present invention.
Figure 2:
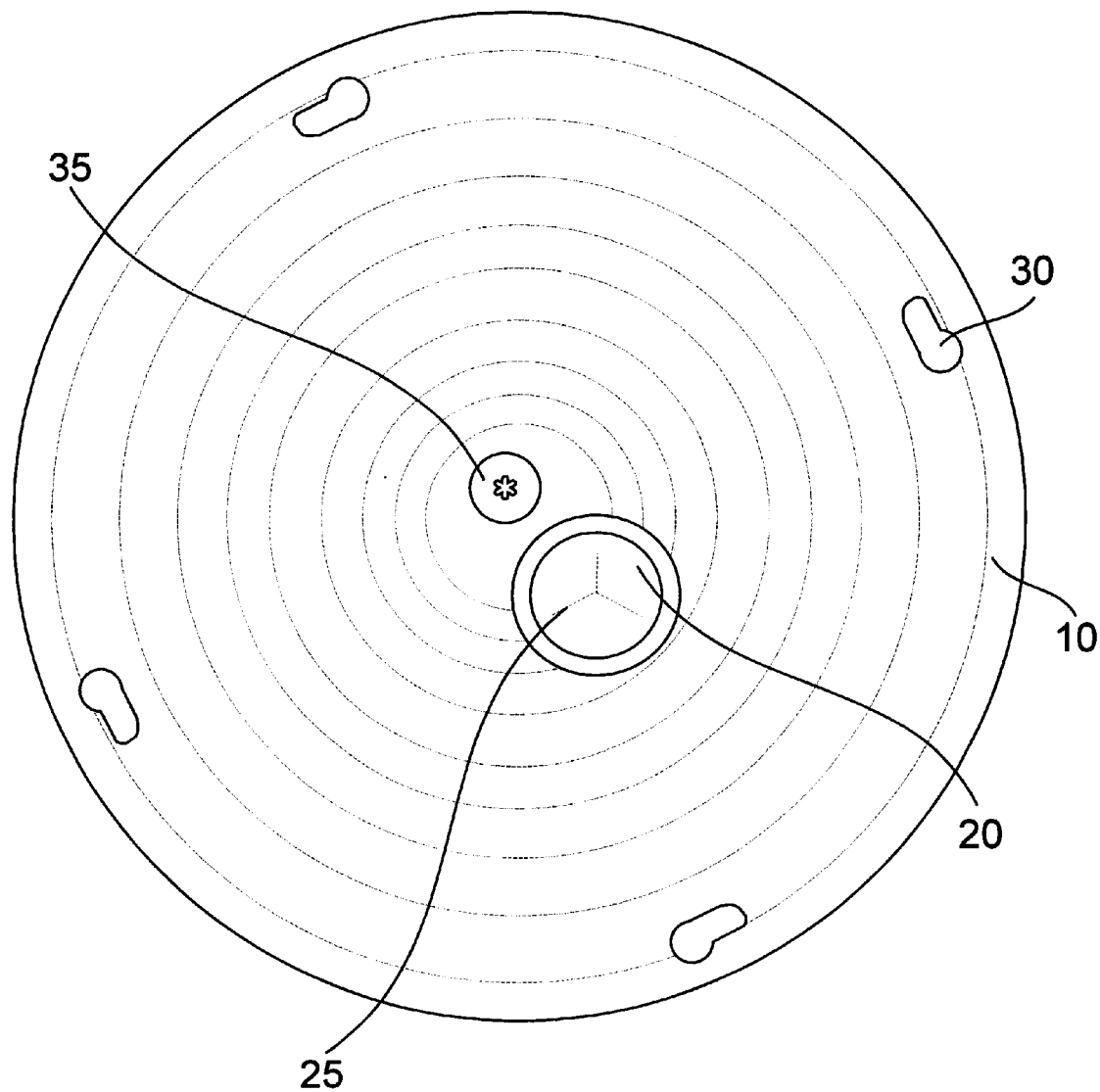
FIG. 2 is a top plan view of the chamber of the wood destroying pest monitor of FIG. 1.
Figure 4:
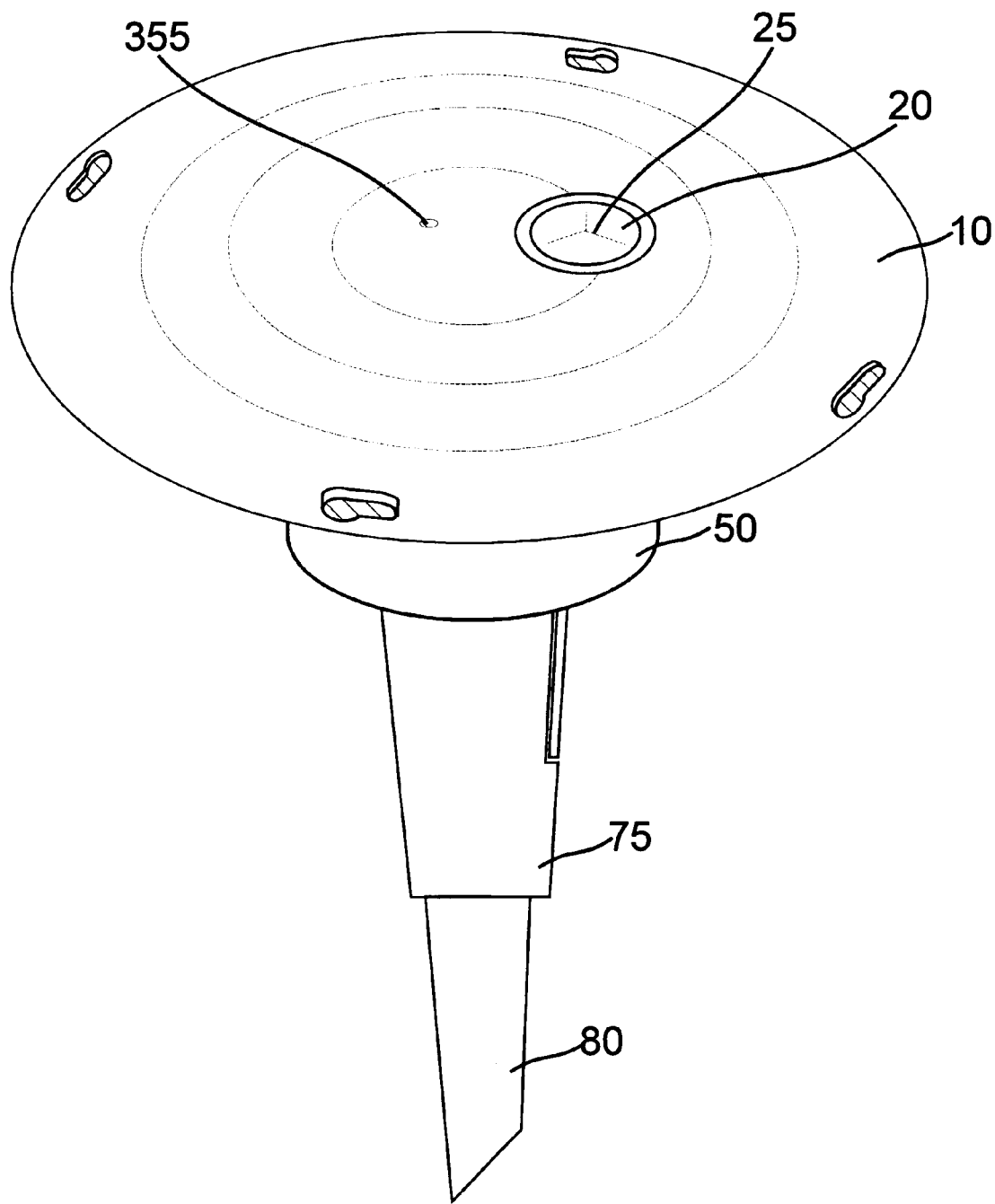
FIG. 4 is an elevated perspective view of the wood destroying pest monitor of FIG. 1.

Referring first to FIGS. 1, 2, and 4, a chamber is designated by the numeral 100, an aperture through which a combustible gas detector 120 (or at least the gas detecting probe 110 of a combustible gas detector) can be inserted is designated by the numeral 20, a monitor stick is designated by the numeral 80, and an additional cellulose monitor material is designated by numeral 75. FIG. 2 illustrates a flange portion of chamber 100 designated by numeral 10.

Monitor stick 80 is configured to be fixedly implanted in the ground, e.g., a stake. Monitor stick 80 is partially surrounded by the additional cellulose monitor material 75, preferably a cardboard, but any material which is an attractive feeding material to wood destroying pests can be used.

Figure 3:
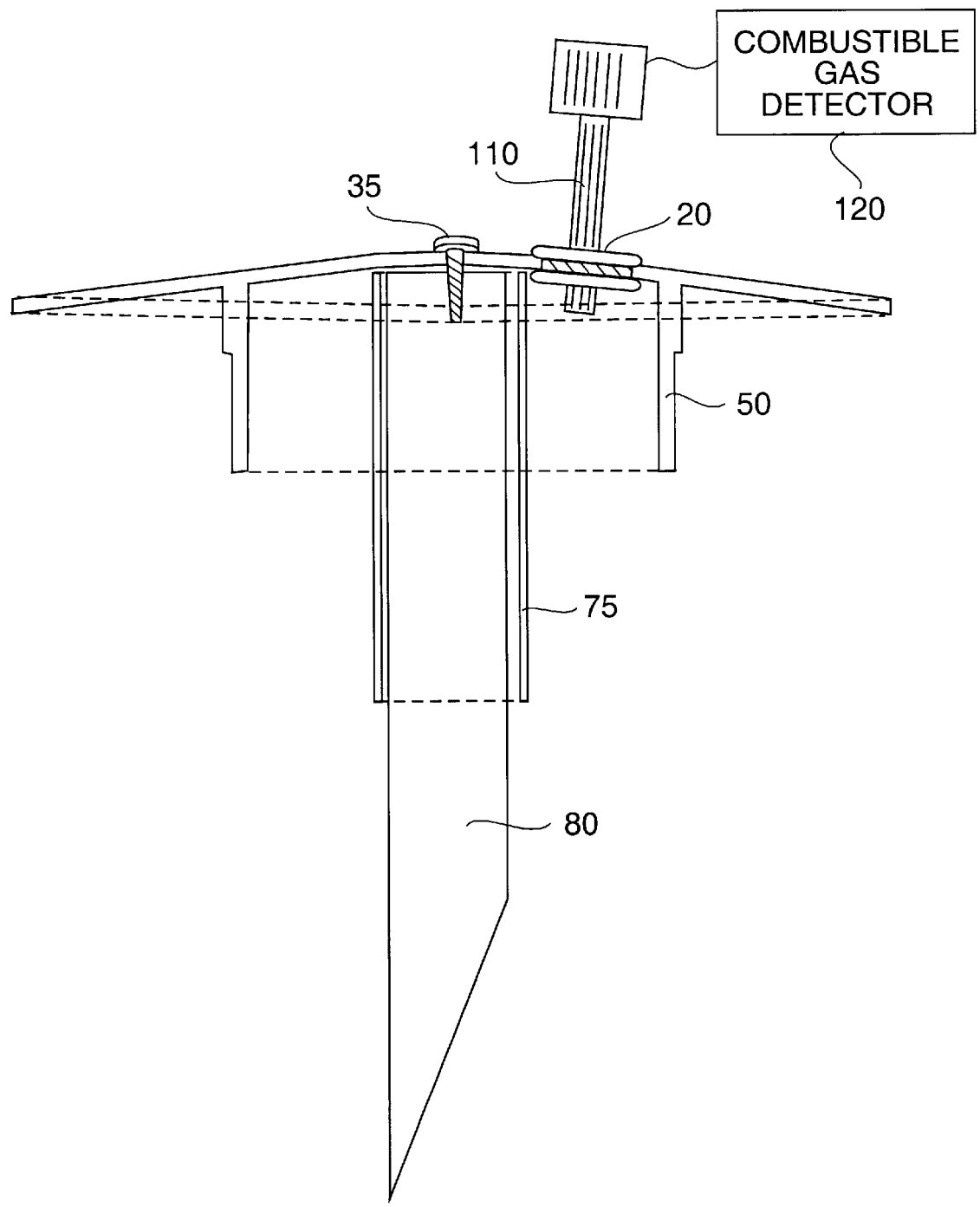
FIG. 3 is an elevational cross section of the wood destroying pest monitor of FIG. 1.

Referring to FIG. 1, the device includes chamber 100, which has a tubular wall 50, preferably cylindrical, but could also be hexagonal, octagonal, etc., depending from flange 10. In a preferred embodiment, flange 10 is a dome-shaped, convex surface designated by the numeral 25 and provided with a thin peripheral edge designated by the numeral 15. The flange 10 includes an aperture in which a plug 20 is inserted. Plug 20 is made from a pliant or resilient material, such as rubber or silicon, and seals the aperture closed (See FIG. 3). Plug 20 is penetrable, e.g., by the provision of slits in the material (three are shown in phantom lines), for passing a gas detector probe there through while still providing a seal against the gas detector. The flange 10 is shaped so that the interior of chamber 100 is protected from moisture from precipitation, irrigation, dew or other sources. Preferably, a cylindrical wall 50 and flange 10 are an integrated unit; e.g., unitary molded plastic, although multiple piece assemblies could also be used.

The device employs a monitor stick 80, which is preferably made of a wood material that is attractive to subterranean termites. The stick is preferably a stake attached to chamber 50 by a screw designated by the number 35, which proceeds through the flange 10 into stake 80 thereby attaching the same. Typically the stake may be a wood material, such as Douglas Fir, or Southern Yellow Pine, or another wood widely used in construction and susceptible to attack by subterranean termites. For other wood destroying pests, monitor stick 80 is to be made of a wood or material that is attractive to such pests. It also should be understood that the wood material may be solid, natural wood, or made of more than one type of wood, or a composite material (e.g., particle board or cardboard).

The upper portion of monitor stick 80 preferably is surrounded with an additional cellulose material 75, e.g., a material made of cellulose fibers, typically corrugated cardboard, and dimensioned so that it may slide on or off the top of the monitor stick 80 but is still in close contact with it. The cellulose material 75 may be provided as a sheet to be wrapped around monitor stick 80, or a preformed tube to fit over stick 80 or a viscous material to be applied like an adhesive or a paint. The lower end of stick 80 is configured to penetrate into the earth, e.g., pointed or tapered.

The flange 10 preferably has a low profile so that it does not cause persons walking in the vicinity of the monitor station to trip on it. The monitor station may be made of any color. If the monitor is to be placed in a lawn, it is preferably made green in color to camouflage it with the green color of the grass. Conversely, if the monitors are to be in an area where there is foot traffic, they may be red or orange to call attention to their presence. The color of the monitors has nothing to do with their ability to function as monitors for wood destroying pests.

The outer perimeter of flange 10 preferably is several inches larger than the perimeter of tubular wall 50 to overhang its perimeter. Tubular wall 50 is preferably larger than the diameter (or outer dimension if, for example, a square or other section stick is used) of the monitor stick 80 to form a void for the collection of combustible gas released by feeding subterranean termites.

The combustible gas may be easily detected using a combustible gas detector inserted through plug 20. If combustible gas is detected it is apparent to the operator that subterranean termites are present without the need to extract the monitor from the ground. Thus, the monitor may be periodically checked by using the combustible gas detection method outlined above. One suitable combustible gas detector is the GasMate™ combustible gas leak detector, commercially available from Leybold Inficon, East Syracuse, N.Y. In this regard, in one alternate embodiment, the combustible gas detector can be a device that is not left inserted in the chamber, but rather, is carried from monitor to monitor. Thus, the combustible gas detector preferably has a probe that can be temporarily inserted through plug 20 into a chamber 50 for a time sufficient to measure the combustible gas level and determine whether or not pests are present in each monitor. One suitable combustible gas is methane.

The monitor of this invention is a food source for any subterranean termites in its immediate vicinity and those pests will attack the monitor stick 80.

In accordance another aspect of the present invention, a number of monitors are arrayed around a structure to be protected. In use, they are placed in the vicinity of the foundation of the structure and in areas conductive to subterranean termites on the surrounding property. The monitors of this invention can be any size and still function.

One skilled in the art will appreciate the present invention can be practiced by other than the embodiments disclosed, which are provided for purposes of illustration and not of limitation.

I claim:

1. Apparatus insertable in-ground for monitoring the presence of wood destroying subterranean termites, comprising:
   a) a chamber having an interior, a closed upper portion, a lower portion and an open bottom at the lower portion, the upper portion comprising a flange extending outwardly of said chamber;
   b) an opening in said upper portion to said chamber interior and a plug inserted in said opening, said plug being penetrable;
   c) a combustible gas detector having a probe able to penetrate at least partially through said plug into said chamber; and
   d) a wood destroying pest monitor stick connected to said apparatus to be fixedly implanted in the ground in contact with the earth and located at least partially in said chamber.

2. The apparatus of claim 1, wherein said chamber interior is cylindrical.

3. The apparatus of claim 2 wherein said chamber has a first length and a diameter of between 2 and 3 inches.

4. The apparatus of claim 1 wherein said chamber has a diameter and said flange is circular and is at least two inches greater in diameter than said chamber.

5. The apparatus of claim 1 wherein said combustible gas detector comprises a combustible gas leak detector.

6. The apparatus of claim 1 further comprising a cellulose material positioned around said monitor stick.

7. The apparatus of claim 1 wherein said monitor stick is a wood material.

8. A method for detecting wood destroying subterranean termites comprising the steps of placing in the ground a wood destroying subterranean termite monitor containing a chamber and a monitor stick that is fixedly implanted in the ground in contact with the earth when said monitor is so placed, using said monitor stick to attract wood destroying subterranean termites, trapping combustible gas excreted by wood destroying subterranean termites attracted to said monitor stick in said chamber, testing for the presence of combustible gas in said chamber, and determining that said pests are present in response to the determining that combustible gas is present.

9. The method of claim 8 further comprising providing a wooden stick as said monitor in said chamber and inserting said wooden stick in the ground in contact with the earth.

10. The method of claim 8 wherein testing for combustible gas further comprises using a combustible gas leak detector device and inserting a gas leak detector probe in said chamber.

11. A method for constructing a wood destroying subterranean termite monitor comprising the steps of connecting a flange containing an aperture to a hollow chamber with first and second ends, said flange connecting to said first end, and said aperture opening to said hollow chamber; placing a penetrable plug in said aperture; inserting a monitor stick into said second end of said hollow chamber, said monitor stick connected to said monitor to be fixedly implanted in the ground in contact with the earth, and wrapping a second cellulose material around said monitor stick.

12. Apparatus for monitoring the presence of wood destroying subterranean termites, comprising:
   a) a chamber having an interior, a closed upper portion, a lower portion and an open bottom at the lower portion, the upper portion comprising a flange extending outwardly of said chamber;
   b) an opening in said upper portion to said chamber interior and a plug inserted in said opening, said plug being penetrable; and
   c) a wood destroying pest monitor stick adapted to be fixedly implanted in the ground and located at least partially in said chamber, said monitor stick located in said apparatus so as to be in direct contact with the earth when said apparatus is inserted in-ground.

13. The apparatus of claim 12 wherein said plug is penetrable by a combustible gas detector having a probe able to penetrate at least partially through said plug into said chamber.

14. Apparatus for monitoring the presence of wood destroying subterranean termites, comprising:
   a) chamber having an interior, a closed upper portion, a lower portion and an open bottom at the lower portion, the upper portion comprising a flange extending outwardly of said chamber;
   b) an opening in said upper portion to said chamber interior and a plug inserted in said opening, said plug being penetrable by a combustible gas detector having a probe able to penetrate at least partially through said plug into said chamber; and
   c) a wood destroying pest monitor stick located at least partially in said chamber, said monitor located within said apparatus so as to be in direct contact with the earth when said apparatus is inserted in-ground.

15. The apparatus of claim 12 or 14 wherein said chamber interior has a cylindrical cross-section.

16. The apparatus of claim 12 or 14 wherein the chamber interior has a non-cylindrical cross-section.

17. A method of protecting a structure from wood destroying subterranean termites comprising the steps of providing, around at least a portion of said structure to be protected, a plurality of subterranean termite monitors, at least some of said monitors including a chamber having an opening with a penetrable plug inserted therein and a monitor stick connected to said monitor to be fixedly implanted in the ground in contact with the earth.

18. The method of claim 17 including the further step of inserting a combustible gas detector probe at least partially through said plug to test for the presence of combustible gas in said chamber.

* * * * *